US009564658B2

(12) United States Patent
Chu et al.

(10) Patent No.: US 9,564,658 B2
(45) Date of Patent: Feb. 7, 2017

(54) LITHIUM-ION SECONDARY BATTERY AND ELECTROLYTE THEREOF

(71) Applicant: Ningde Amperex Technology Limited, Ningde (CN)

(72) Inventors: Chunbo Chu, Ningde (CN); Chenghua Fu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 255 days.

(21) Appl. No.: 14/558,589

(22) Filed: Dec. 2, 2014

(65) Prior Publication Data

US 2015/0171473 A1    Jun. 18, 2015

(30) Foreign Application Priority Data

Dec. 12, 2013  (CN) .......................... 2013 1 0675269

(51) Int. Cl.
| | | |
|---|---|---|
| *H01M 10/05* | (2010.01) | |
| *H01M 10/0567* | (2010.01) | |
| *H01M 10/0569* | (2010.01) | |
| *H01M 10/0525* | (2010.01) | |

(52) U.S. Cl.
CPC ..... *H01M 10/0567* (2013.01); *H01M 10/0525* (2013.01); *H01M 10/0569* (2013.01); *H01M 2300/0025* (2013.01); *H01M 2300/0037* (2013.01); *Y02P 70/54* (2015.11)

(58) Field of Classification Search
None
See application file for complete search history.

(56) References Cited

U.S. PATENT DOCUMENTS

| | | | |
|---|---|---|---|
| 5,626,981 A | 5/1997 | Simon et al. | |
| 6,033,809 A | 3/2000 | Hamamoto et al. | |
| 2009/0017386 A1* | 1/2009 | Xu ...................... | H01M 4/40 429/331 |
| 2014/0242445 A1* | 8/2014 | Gozdz .................. | H01M 4/133 429/158 |
| 2015/0171398 A1* | 6/2015 | Roumi ................. | H01M 2/1673 429/7 |
| 2015/0325839 A1* | 11/2015 | Put ...................... | H01M 4/134 429/231.4 |

FOREIGN PATENT DOCUMENTS

| | | |
|---|---|---|
| CN | 101755354 | 6/2010 |
| CN | 102479976 | 5/2012 |
| JP | 200773318 | 3/2007 |

* cited by examiner

*Primary Examiner* — Scott J Chmielecki
(74) *Attorney, Agent, or Firm* — Morgan, Lewis & Bockius LLP

(57) ABSTRACT

The present disclosure provides a lithium-ion secondary battery and an electrolyte thereof. The electrolyte comprises a lithium salt; a non-aqueous solvent and an additive comprising a first additive and a second additive, the first additive comprises at least one of vinylene carbonate and vinyl ethylene carbonate, the second additive is 4-methylene-1,3-dioxolan-2-one and its derivatives with a structural formula 1 and/or 4,5-dimethylene-1,3-dioxolan-2-one and its derivatives with a structural formula 2; in the structural formula 1 and the structural formula 2, $R_1$, $R_2$, $R_3$ and $R_4$ each are hydrogen, halogen, C1~C3 alkyl or halogenated alkyl; a weight percentage of the first additive in the electrolyte is 0.2%~2.0%, a weight percentage of the second additive in the electrolyte is 0.3%~4.0%. The lithium-ion secondary battery comprises the aforementioned electrolyte. The lithium-ion secondary battery has better cycle performance, better low temperature discharging performance, and higher first coulombic efficiency.

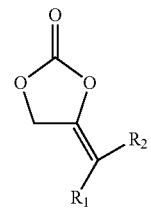

structural formula 1

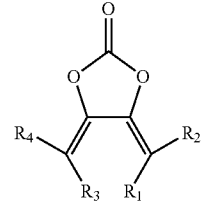

structural formula 2

14 Claims, No Drawings

LITHIUM-ION SECONDARY BATTERY AND ELECTROLYTE THEREOF

REFERENCE TO RELATED APPLICATIONS

The present disclosure claims priority to Chinese Patent Application No. CN201310675269.5 filed on Dec. 12, 2013, the content of which is fully incorporated in its entirety herein.

FIELD OF THE PRESENT DISCLOSURE

The present disclosure relates to a field of a battery, and particularly to a lithium-ion secondary battery and an electrolyte thereof.

BACKGROUND OF THE PRESENT DISCLOSURE

Although a lithium-ion secondary battery has advantages such as high working voltage, long service life and fast charging speed and the like, with development of technology and people's demand for fast and convenient electronic products, the lithium-ion secondary battery is required to have better cycle performance, and is also required to be capable of quickly discharging in condition of lower temperature.

In practice, cyclic carbonate ester and chain carbonate ester are usually used as solvent, but the solvent is continuously oxidized or reduced during charging-discharging process of the lithium-ion secondary battery, the first coulombic efficiency of the lithium-ion secondary battery is lower, and the cycle performance of the lithium-ion secondary battery is also deteriorated. U.S. Pat. No. 5,626,981 discloses a method of forming a SEI film on a surface of a negative electrode plate, in which the first coulombic efficiency and the cycle performance of the lithium-ion secondary battery are improved by adding vinylene carbonate (VC) into an electrolyte. However, due to addition of vinylene carbonate (VC), the SEI film formed on the surface of the negative electrode plate will be too thick, the impedance of the SEI film is relative large, therefore the discharging performance in condition of low temperature of the lithium-ion secondary battery would be deteriorated.

Chinese patent application publication No. CN101755354A discloses a method of forming a SEI film on a surface of a negative electrode plate, in which 4-methylene-1,3-dioxolan-2-one is added into an electrolyte, the cycle performance of the lithium-ion secondary battery is improved, but the low temperature discharging performance is not mentioned in this patent document.

Therefore, it is necessary to provide a lithium-ion secondary battery and an electrolyte thereof, which has better cycle performance and better discharging performance in condition of low temperature.

SUMMARY OF THE PRESENT DISCLOSURE

In view of the problems existing in the background technology, an object of the present disclosure is to provide a lithium-ion secondary battery and an electrolyte thereof, the lithium-ion secondary battery has better cycle performance and better low temperature discharging performance, meanwhile further has higher first coulombic efficiency.

In order to achieve the above objects, in a first aspect of the present disclosure, the present disclosure provides an electrolyte of a lithium-ion secondary battery which comprises: a lithium salt; a non-aqueous solvent; and an additive. The additive comprises a first additive and a second additive, the first additive comprises at least one of vinylene carbonate (VC) and vinyl ethylene carbonate (VEC), the second additive is 4-methylene-1,3-dioxolan-2-one and its derivatives with a structural formula 1 and/or 4,5-dimethylene-1,3-dioxolan-2-one and its derivatives with a structural formula 2; in the structural formula 1 and the structural formula 2, $R_1$, $R_2$, $R_3$, and $R_4$ each are hydrogen, halogen, C1~C3 alkyl or halogenated alkyl; a weight percentage of the first additive in the electrolyte of the lithium-ion secondary battery is 0.2%~2.0%, a weight percentage of the second additive in electrolyte of the lithium-ion secondary battery is 0.3%~4.0%.

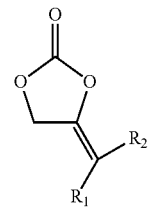

structural formula 1

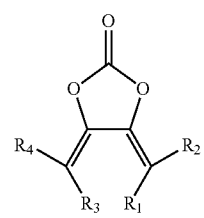

structural formula 2

In a second aspect of the present disclosure, the present disclosure provides a lithium-ion secondary battery which comprises: a positive electrode plate; a negative electrode plate; a separator interposed between the positive electrode plate and the negative electrode plate; and an electrolyte. The electrolyte is the electrolyte according to the first aspect of the present disclosure.

The present disclosure has following beneficial effects:

In the electrolyte of the present disclosure, by adding the first additive and the second additive, the composite SEI film, which is good for lithium ion transfer, can be formed on the surface of the negative electrode plate of the lithium-ion secondary battery, therefore the lithium-ion secondary battery has better cycle performance and better low temperature discharging performance and higher first coulombic efficiency.

DETAILED DESCRIPTION

Hereinafter a lithium-ion secondary battery and an electrolyte thereof and a preparation method thereof according to the present disclosure are described in detail.

Firstly, an electrolyte of a lithium-ion secondary battery according to a first aspect of the present disclosure is described, which comprises: a lithium salt; a non-aqueous solvent; and an additive, the additive comprises a first additive and a second additive. The first additive comprises at least one of vinylene carbonate (VC) and vinyl ethylene carbonate (VEC), the second additive is 4-methylene-1,3-dioxolan-2-one and its derivatives with a structural formula 1 and/or 4,5-dimethylene-1,3-dioxolan-2-one and its derivatives with a structural formula 2; in the structural formula 1 and the structural formula 2, $R_1$, $R_2$, $R_3$ and $R_4$ each are hydrogen, halogen, C1~C3 alkyl or halogenated alkyl, a weight percentage of the first additive in the electrolyte of the lithium-ion secondary battery is 0.2%~2.0%. Specifically, when the first additive is only vinylene carbonate (VC), the weight percentage of vinylene carbonate (VC) in the electrolyte of the lithium-ion secondary battery is 0.2%~2.0%; when the first additive is only vinyl ethylene carbonate (VEC), the weight percentage of vinyl ethylene carbonate (VEC) in the electrolyte of the lithium-ion secondary battery is 0.2%~2.0%; when the first additive is vinylene carbonate (VC) and vinyl ethylene carbonate (VEC), the overall weight percentage of vinylene carbonate (VC) and vinyl ethylene carbonate (VEC) in the electrolyte of the lithium-ion secondary battery is 0.2%~2.0%. The weight percentage of the second additive in the electrolyte of the lithium-ion secondary battery is 0.3%~4.0%. Specifically, when the second additive is only 4-methylene-1,3-dioxolan-2-one and its derivatives with the structural formula 1, the weight percentage of 4-methylene-1,3-dioxolan-2-one and its derivatives with the structural formula 1 in the electrolyte of the lithium-ion secondary battery is 0.3%~4.0%; when the second additive is only 4,5-dimethylene-1,3-dioxolan-2-one and its derivatives with the structural formula 2, the weight percentage of 4,5-dimethylene-1,3-dioxolan-2-one and its derivatives with the structural formula 2 in the electrolyte of the lithium-ion secondary battery is 0.3%~4.0%; when the second additive is 4-methylene-1,3-dioxolan-2-one and its derivatives with the structural formula 1 and 4,5-dimethylene-1,3-dioxolan-2-one and its derivatives with the structural formula 2, the overall weight percentage of 4-methylene-1,3-dioxolan-2-one and its derivatives with the structural formula 1 and 4,5-dimethylene-1,3-dioxolan-2-one and its derivatives with the structural formula 2 in the electrolyte of the lithium-ion secondary battery is 0.3%~4.0%.

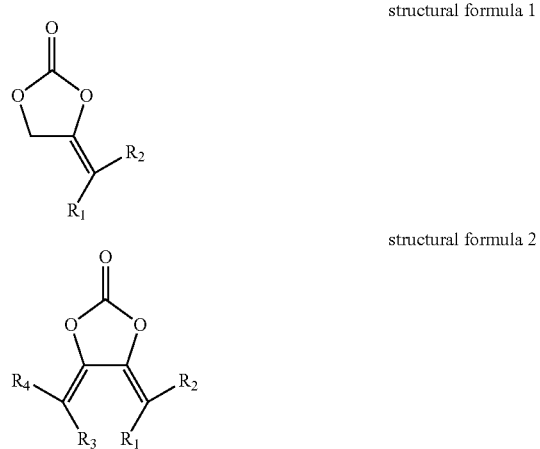

structural formula 1 structural formula 2

In the electrolyte of the lithium-ion secondary battery according to the first aspect of the present disclosure, by that vinylene carbonate (VC) and/or vinyl ethylene carbonate (VEC) and 4-methylene-1,3-dioxolan-2-one and its derivatives and/or 4,5-dimethylene-1,3-dioxolan-2-one and its derivatives are added into the electrolyte of the lithium-ion secondary battery, the obtained lithium-ion secondary battery has better cycle performance and better low temperature discharging performance and higher first coulombic efficiency. This is because 4-methylene-1,3-dioxolan-2-one and its derivatives and/or 4,5-dimethylene-1,3-dioxolan-2-one and its derivatives have (has) a higher reduction potential than vinylene carbonate (VC) and/or vinyl ethylene carbonate (VEC), the potential of the negative electrode plate is changed from high to low as the formation charging, 4-methylene-1,3-dioxolan-2-one and its derivatives and/or 4,5-dimethylene-1,3-dioxolan-2-one and its derivatives preferentially form a layer of SEI film with a lower impedance on the surface of the negative electrode plate, then vinylene carbonate (VC) and/or vinyl ethylene carbonate (VEC) form another SEI film on the above SEI film. In comparison with the SEI film which is formed on the surface of the negative electrode plate only by vinylene carbonate (VC) and/or vinyl ethylene carbonate (VEC), the composite SEI film which is formed by vinylene carbonate (VC) and/or vinyl ethylene carbonate (VEC) and 4-methylene-1,3-dioxolan-2-one and its derivatives and/or 4,5-dimethylene-1,3-dioxolan-2-one and its derivatives is better for the transfer of the lithium ions in condition of low temperature, therefore the lithium-ion secondary battery has better low temperature discharging performance, which may be because that C═C connecting the methylene and the cyclopentyl of 4-methylene-1,3-dioxolan-2-one and its derivatives and/or 4,5-dimethylene-1,3-dioxolan-2-one and its derivatives and C═C of vinylene carbonate (VC) and/or vinyl ethylene carbonate (VEC) are polymerized, configurations of the two additives are tightly coupled to form a compact composite SEI film, and the composite SEI film has better lithium ion transfer performance, therefore the low temperature discharging performance and the first coulombic efficiency of the lithium-ion secondary battery are improved. Since the formed compact composite SEI film prevents by-reaction between the active material of the negative electrode plate and the electrolyte, therefore the cycle performance of the lithium-ion secondary battery is also improved.

In the electrolyte of the lithium-ion secondary battery according to the first aspect of the present disclosure, if the weight percentage of vinylene carbonate (VC) and/or vinyl ethylene carbonate (VEC) and 4-methylene-1,3-dioxolan-2-one and its derivatives and/or 4,5-dimethylene-1,3-dioxolan-2-one and its derivatives in the electrolyte is too high (that is the weight percentage of the first additive in the electrolyte is more than 2.0%, the weight percentage of the second additive in the electrolyte is more than 4.0%), C═C of vinylene carbonate (VC) and/or vinyl ethylene carbonate (VEC) and C═C connecting the methylene and the cyclopentyl of 4-methylene-1,3-dioxolan-2-one and its derivatives and/or 4,5-dimethylene-1,3-dioxolan-2-one and its derivatives will form a too thick SEI film by polymerizing, the impedance of the lithium-ion secondary battery is increased, and the cycle performance and the first coulombic efficiency of the lithium-ion secondary battery are affected; similarly, since the formed SEI film is too thick, the lithium ion transfer performance is affected, thereby reducing the low temperature discharging performance of the lithium-ion secondary battery; if the weight percentage of vinylene carbonate (VC) and/or vinyl ethylene carbonate (VEC) and 4-methylene-1,3-dioxolan-2-one and its derivatives and/or 4,5-dimethylene-1,3-dioxolan-2-one and its derivatives in the electrolyte is too low (that is the weight percentage of the first additive in the electrolyte is less than 0.2%, the weight percentage of the second additive in the electrolyte is less than 0.3%), C═C of vinylene carbonate (VC) and/or vinyl ethylene carbonate (VEC) and C═C connecting the methylene and the cyclopentyl of 4-methylene-1,3-dioxolan-2-one and its derivatives and/or 4,5-dimethylene-1,3-dioxolan-2-one and its derivatives cannot form an effective and compact SEI film, which cannot prevent the by-reaction between the electrolyte of the lithium-ion secondary battery and the negative electrode plate, and cannot effectively improve the cycle performance of the lithium-ion secondary battery, meanwhile the lithium ion transfer performance of the formed SEI film is worse, thereby reducing the low temperature discharging performance and the first coulombic efficiency of the lithium-ion secondary battery.

In the electrolyte of the lithium-ion secondary battery according to the first aspect of the present disclosure, the lithium salt may comprise at least one of $LiN(C_xF_{2x+1}SO_2)(C_yF_{2y+1}SO_2)$ (where x, y is positive integer), $LiPF_6$, $LiBF_4$, LiBOB, $LiAsF_6$, $Li(CF_3SO_2)_2N$, $LiCF_3SO_3$ and $LiClO_4$.

In the electrolyte of the lithium-ion secondary battery according to the first aspect of the present disclosure, a concentration of the lithium salt may be 0.5M~2M.

In the electrolyte of the lithium-ion secondary battery according to the first aspect of the present disclosure, the non-aqueous solvent may comprise a combination of a cyclic carbonate ester and a chain carbonate ester. The cyclic carbonate ester has a higher dielectric constant, and can effectively react with lithium ions to form a solvated lithium ion; the chain carbonate ester has a lower viscosity and is good for lithium ion transfer and can improve the low temperature performance of the electrolyte.

In the electrolyte of the lithium-ion secondary battery according to the first aspect of the present disclosure, the cyclic carbonate ester may comprise at least one of ethylene carbonate (EC), propylene carbonate (PC), γ-butyrolactone (GBL) and 2,3-butylene carbonate (BC); the chain carbonate ester may comprise at least one of dimethyl carbonate (DMC), diethyl carbonate (DEC), dipropyl carbonate (DPC), ethyl methyl carbonate (EMC), methyl propyl carbonate (MPC) and ethyl propyl carbonate (EPC).

In the electrolyte of the lithium-ion secondary battery according to the first aspect of the present disclosure, a weight percentage of the cyclic carbonate ester in the electrolyte of the lithium-ion secondary battery may be 10%~70%; a weight percentage of the chain carbonate ester in the electrolyte of the lithium-ion secondary battery may be 15%~80%.

In the electrolyte of the lithium-ion secondary battery according to the first aspect of the present disclosure, preferably, the weight percentage of the first additive in the electrolyte of the lithium-ion secondary battery may be 0.3%~1.5%. Specifically, when the first additive is only vinylene carbonate (VC), the weight percentage of vinylene carbonate (VC) in the electrolyte of the lithium-ion secondary battery is 0.3%~1.5%; when the first additive is only vinyl ethylene carbonate (VEC), the weight percentage of vinyl ethylene carbonate (VEC) in the electrolyte of the lithium-ion secondary battery is 0.3%~1.5%; when the first additive is vinylene carbonate (VC) and vinyl ethylene carbonate (VEC), the overall weight percentage of vinylene carbonate (VC) and vinyl ethylene carbonate (VEC) in the electrolyte of the lithium-ion secondary battery is 0.3%~1.5%.

In the electrolyte of the lithium-ion secondary battery according to the first aspect of the present disclosure, preferably, the weight percentage of the second additive in the electrolyte of the lithium-ion secondary battery may be 0.5%~3.0%. Specifically, when the second additive is only 4-methylene-1,3-dioxolan-2-one and its derivatives with the structural formula 1, the weight percentage of 4-methylene-1,3-dioxolan-2-one and its derivatives with the structural formula 1 in the electrolyte of the lithium-ion secondary battery is 0.5%~3.0%; when the second additive is only 4,5-dimethylene-1,3-dioxolan-2-one and its derivatives with the structural formula 2, the weight percentage of 4,5-dimethylene-1,3-dioxolan-2-one and its derivatives with the structural formula 2 in the electrolyte of a lithium-ion secondary battery is 0.5%~3.0%; when the second additive is 4-methylene-1,3-dioxolan-2-one and its derivatives with the structural formula 1 and 4,5-dimethylene-1,3-dioxolan-2-one and its derivatives with the structural formula 2, the overall weight percentage of 4-methylene-1,3-dioxolan-2-one and its derivatives with the structural formula 1 and 4,5-dimethylene-1,3-dioxolan-2-one and its derivatives with the structural formula 2 in the electrolyte of a lithium-ion secondary battery is 0.5%~3.0%.

In the electrolyte of the lithium-ion secondary battery according to the first aspect of the present disclosure, at least one of $R_1$ and $R_2$ may be fluorine (F).

Next a lithium-ion secondary battery according to a second aspect of the present disclosure is described, which comprises: a positive electrode plate; a negative electrode plate; a separator interposed between the positive electrode plate and the negative electrode plate; and an electrolyte. The electrolyte is the electrolyte according to the first aspect of the present disclosure.

Then examples and comparative examples of the lithium-ion secondary battery and the electrolyte thereof and the preparation method thereof according to the present disclosure are described.

Example 1

(1) Preparation of a Positive Electrode Plate of a Lithium-Ion Secondary Battery $LiCoO_2$ as active material, super-P as conductive material, and PVDF as binder, in a weight ratio of 96:2:2, were uniformly mixed with N-methyl pyrrolidone (NMP) as solvent to form a positive electrode slurry of the lithium-ion secondary battery, the positive electrode slurry was then coated on aluminum foil as current collector, baking was then performed at 85° C., which was followed by cold pressing; then after edge-trimming, plate cutting, slitting, baking at 85° C. for 4 h under vacuum, and welding a tab, the positive electrode plate of the lithium-ion secondary battery was obtained.

(2) Preparation of a Negative Electrode Plate of a Lithium-Ion Secondary Battery Graphite as active material, super-P as conductive material, CMC as thickening agent, and SBR as binder, in a weight ratio of 96.5:1.0:1.0:1.5, were uniformly mixed with deionized water as solvent to form a negative electrode slurry, the negative electrode slurry was then coated on copper foil as current collector, baking was then performed at 85° C., which was followed by edge-trimming, plate cutting, slitting, baking at 110° C. for 4 h under vacuum, and welding a tab, the negative electrode plate of the lithium-ion secondary battery was obtained.

(3) Preparation of an Electrolyte of a Lithium-Ion Secondary Battery

The electrolyte of the lithium-ion secondary battery used a concentration of 1M of $LiPF_6$ as lithium salt, and used a mixture of ethylene carbonate (EC), propylene carbonate (PC) and diethyl carbonate (DEC), in a weight ratio of 30:30:40, as non-aqueous organic solvent. Furthermore, the electrolyte further contained an additive, which consisted of 0.2 wt % of vinylene carbonate (VC) and 0.3 wt % of 4-methylene-1,3-dioxolan-2-one.

(4) Preparation of a Lithium-Ion Secondary Battery

The obtained positive electrode plate and the negative electrode plate of the lithium-ion secondary battery were wound together with PE membrane as separator to form a cell having a thickness of 4.2 mm, a width of 34 mm, and a length of 82 mm, then baking was performed at 75° C. for 10 h under vacuum, which was followed by injection of the prepared electrolyte and standby for 24 h, then charging was performed at a constant current of 0.1 C (160 mA) to 4.2V, then charging at a constant voltage of 4.2V was performed to a current lowering to 0.05 C (80 mA), and discharging was performed at a constant current of 0.1 C (160 mA) to 3.0V, the above charging and discharging were repeated, which was followed by charging at a constant current of 0.1 C (160 mA) to 3.85V, and finally the preparation of the lithium-ion secondary battery was completed.

Example 2

The lithium-ion secondary battery was prepared the same as that in example 1 except that in the preparation of the electrolyte of the lithium-ion secondary battery (step (3)), the additive consisted of 0.2 wt % of vinylene carbonate (VC) and 0.5 wt % of 4-methylene-1,3-dioxolan-2-one.

Example 3

The lithium-ion secondary battery was prepared the same as that in example 1 except that in the preparation of the electrolyte of the lithium-ion secondary battery (step (3)), the additive consisted of 0.2 wt % of vinylene carbonate (VC) and 1.0 wt % of 4-methylene-1,3-dioxolan-2-one.

Example 4

The lithium-ion secondary battery was prepared the same as that in example 1 except that in the preparation of the electrolyte of the lithium-ion secondary battery (step (3)), the additive consisted of 0.2 wt % of vinylene carbonate (VC) and 3.0 wt % of 4-methylene-1,3-dioxolan-2-one.

Example 5

The lithium-ion secondary battery was prepared the same as that in example 1 except that in the preparation of the electrolyte of the lithium-ion secondary battery (step (3)), the additive consisted of 0.2 wt % of vinylene carbonate (VC) and 4.0 wt % of 4-methylene-1,3-dioxolan-2-one.

Example 6

The lithium-ion secondary battery was prepared the same as that in example 1 except that in the preparation of the electrolyte of the lithium-ion secondary battery (step (3)), the additive consisted of 0.2 wt % of vinylene carbonate (VC) and 0.5 wt % of 4,5-dimethylene-1,3-dioxolan-2-one.

Example 7

The lithium-ion secondary battery was prepared the same as that in example 1 except that in the preparation of the electrolyte of the lithium-ion secondary battery (step (3)), the additive consisted of 0.3 wt % of vinylene carbonate (VC) and 0.5 wt % of 4,5-dimethylene-1,3-dioxolan-2-one.

Example 8

The lithium-ion secondary battery was prepared the same as that in example 1 except that in the preparation of the electrolyte of the lithium-ion secondary battery (step (3)), the additive consisted of 0.5 wt % of vinylene carbonate (VC) and 0.5 wt % of 4,5-dimethylene-1,3-dioxolan-2-one.

Example 9

The lithium-ion secondary battery was prepared the same as that in example 1 except that in the preparation of the electrolyte of the lithium-ion secondary battery (step (3)), the additive consisted of 1.0 wt % of vinylene carbonate (VC) and 0.5 wt % of 4,5-dimethylene-1,3-dioxolan-2-one.

Example 10

The lithium-ion secondary battery was prepared the same as that in example 1 except that in the preparation of the electrolyte of the lithium-ion secondary battery (step (3)), the additive consisted of 1.5 wt % of vinylene carbonate (VC) and 0.5 wt % of 4,5-dimethylene-1,3-dioxolan-2-one.

Example 11

The lithium-ion secondary battery was prepared the same as that in example 1 except that in the preparation of the electrolyte of the lithium-ion secondary battery (step (3)), the additive consisted of 2.0 wt % of vinylene carbonate (VC) and 0.5 wt % of 4,5-dimethylene-1,3-dioxolan-2-one.

Example 12

The lithium-ion secondary battery was prepared the same as that in example 1 except that in the preparation of the electrolyte of the lithium-ion secondary battery (step (3)), the additive consisted of 0.2 wt % of vinyl ethylene carbonate (VEC) and 0.5 wt % of 4,5-dimethylene-1,3-dioxolan-2-one.

Example 13

The lithium-ion secondary battery was prepared the same as that in example 1 except that in the preparation of the electrolyte of the lithium-ion secondary battery (step (3)), the additive consisted of 0.3 wt % of vinyl ethylene carbonate (VEC) and 0.5 wt % of 4,5-dimethylene-1,3-dioxolan-2-one.

Example 14

The lithium-ion secondary battery was prepared the same as that in example 1 except that in the preparation of the electrolyte of the lithium-ion secondary battery (step (3)), the additive consisted of 0.5 wt % of vinyl ethylene carbonate (VEC) and 0.5 wt % of 4,5-dimethylene-1,3-dioxolan-2-one.

Example 15

The lithium-ion secondary battery was prepared the same as that in example 1 except that in the preparation of the electrolyte of the lithium-ion secondary battery (step (3)), the additive consisted of 1.0 wt % of vinyl ethylene carbonate (VEC) and 0.5 wt % of 4,5-dimethylene-1,3-dioxolan-2-one.

Example 16

The lithium-ion secondary battery was prepared the same as that in example 1 except that in the preparation of the electrolyte of the lithium-ion secondary battery (step (3)), the additive consisted of 1.5 wt % of vinyl ethylene carbonate (VEC) and 0.5 wt % of 4,5-dimethylene-1,3-dioxolan-2-one.

Example 17

The lithium-ion secondary battery was prepared the same as that in example 1 except that in the preparation of the electrolyte of the lithium-ion secondary battery (step (3)), the additive consisted of 2.0 wt % of vinyl ethylene carbonate (VEC) and 0.5 wt % of 4,5-dimethylene-1,3-dioxolan-2-one.

Example 18

The lithium-ion secondary battery was prepared the same as that in example 1 except that in the preparation of the electrolyte of the lithium-ion secondary battery (step (3)), the additive consisted of 0.3 wt % of vinylene carbonate (VC) and 0.5 wt % of 4-methylene-1,3-dioxolan-2-one and 0.5 wt % of 4,5-dimethylene-1,3-dioxolan-2-one.

Example 19

The lithium-ion secondary battery was prepared the same as that in example 1 except that in the preparation of the electrolyte of the lithium-ion secondary battery (step (3)), the additive consisted of 0.3 wt % of vinylene carbonate (VC) and 1.5 wt % of 4-methylene-1,3-dioxolan-2-one and 1.0 wt % of 4,5-dimethylene-1,3-dioxolan-2-one.

Example 20

The lithium-ion secondary battery was prepared the same as that in example 1 except that in the preparation of the electrolyte of the lithium-ion secondary battery (step (3)), the additive consisted of 1.0 wt % of vinylene carbonate (VC) and 2.0 wt % of 4-methylene-1,3-dioxolan-2-one and 2.0 wt % of 4,5-dimethylene-1,3-dioxolan-2-one.

Example 21

The lithium-ion secondary battery was prepared the same as that in example 1 except that in the preparation of the electrolyte of the lithium-ion secondary battery (step (3)), the additive consisted of 0.3 wt % of vinylene carbonate (VC) and 1.0 wt % of 4,5-dimethylene-1,3-dioxolan-2-one.

Example 22

The lithium-ion secondary battery was prepared the same as that in example 1 except that in the preparation of the electrolyte of the lithium-ion secondary battery (step (3)), the additive consisted of 1.5 wt % of vinylene carbonate (VC) and 1.0 wt % of 4,5-diethylene-1,3-dioxolan-2-one.

Example 23

The lithium-ion secondary battery was prepared the same as that in example 1 except that in the preparation of the electrolyte of the lithium-ion secondary battery (step (3)), the additive consisted of 0.3 wt % of vinylene carbonate (VC) and 1.0 wt % of 4-(3-fluoropropylene)-1,3-dioxolan-2-one.

Example 24

The lithium-ion secondary battery was prepared the same as that in example 1 except that in the preparation of the electrolyte of the lithium-ion secondary battery (step (3)), the additive consisted of 0.5 wt % of vinylene carbonate (VC) and 0.5 wt % of vinyl ethylene carbonate (VEC) and 0.5 wt % of 4,5-dimethylene-1,3-dioxolan-2-one.

Example 25

The lithium-ion secondary battery was prepared the same as that in example 1 except that in the preparation of the electrolyte of the lithium-ion secondary battery (step (3)), the additive consisted of 0.3 wt % of vinylene carbonate (VC) and 0.5 wt % of 4-fluoromethylene-1,3-dioxolan-2-one.

Example 26

The lithium-ion secondary battery was prepared the same as that in example 1 except that in the preparation of the electrolyte of the lithium-ion secondary battery (step (3)), the additive consisted of 0.3 wt % of vinylene carbonate (VC) and 0.5 wt % of 4,5-difluoromethylene-1,3-dioxolan-2-one.

Example 27

The lithium-ion secondary battery was prepared the same as that in example 1 except that in the preparation of the electrolyte of the lithium-ion secondary battery (step (3)), the additive consisted of 1.0 wt % of vinylene carbonate (VC) and 1.0 wt % of 4-fluoromethylene-1,3-dioxolan-2-one.

Example 28

The lithium-ion secondary battery was prepared the same as that in example 1 except that in the preparation of the electrolyte of the lithium-ion secondary battery (step (3)), the additive consisted of 1.5 wt % of vinylene carbonate (VC) and 3.0 wt % of 4-fluoromethylene-1,3-dioxolan-2-one.

Comparative Example 1

The lithium-ion secondary battery was prepared the same as that in example 1 except that in the preparation of the electrolyte of the lithium-ion secondary battery (step (3)) there was no additive.

Comparative Example 2

The lithium-ion secondary battery was prepared the same as that in example 1 except that in the preparation of the electrolyte of the lithium-ion secondary battery (step (3)), the additive consisted of 1.0 wt % of vinylene carbonate (VC).

Comparative Example 3

The lithium-ion secondary battery was prepared the same as that in example 1 except that in the preparation of the electrolyte of the lithium-ion secondary battery (step (3)), the additive consisted of 2.0 wt % of 4-methylene-1,3-dioxolan-2-one.

Comparative Example 4

The lithium-ion secondary battery was prepared the same as that in example 1 except that in the preparation of the electrolyte of the lithium-ion secondary battery (step (3)), the additive consisted of 0.05 wt % of vinylene carbonate (VC) and 0.05 wt % of 4-methylene-1,3-dioxolan-2-one.

Comparative Example 5

The lithium-ion secondary battery was prepared the same as that in example 1 except that in the preparation of the electrolyte of the lithium-ion secondary battery (step (3)), the additive consisted of 3.0 wt % of vinyl ethylene carbonate (VEC) and 5.0 wt % of 4-methylene-1,3-dioxolan-2-one.

Comparative Example 6

The lithium-ion secondary battery was prepared the same as that in example 1 except that in the preparation of the electrolyte of the lithium-ion secondary battery (step (3)), the additive consisted of 0.05 wt % of vinylene carbonate (VC) and 1.0 wt % of 4-methylene-1,3-dioxolan-2-one.

Comparative Example 7

The lithium-ion secondary battery was prepared the same as that in example 1 except that in the preparation of the electrolyte of the lithium-ion secondary battery (step (3)), the additive consisted of 1.0 wt % of vinyl ethylene carbonate (VEC) and 5.0 wt % of 4-methylene-1,3-dioxolan-2-one.

Comparative Example 8

The lithium-ion secondary battery was prepared the same as that in example 1 except that in the preparation of the electrolyte of the lithium-ion secondary battery (step (3)), the additive consisted of 3.0 wt % of vinylene carbonate (VC) and 1.5 wt % of 4-methylene-1,3-dioxolan-2-one.

Comparative Example 9

The lithium-ion secondary battery was prepared the same as that in example 1 except that in the preparation of the electrolyte of the lithium-ion secondary battery (step (3)), the additive consisted of 1.5 wt % of vinylene carbonate (VC) and 0.05 wt % of 4-methylene-1,3-dioxolan-2-one.

Finally tests and test results of examples 1-28 and comparative examples 1-9 of the lithium-ion secondary battery of the present disclosure were presented.

(1) Test of the First Coulombic Efficiency

Each of the lithium-ion secondary batteries was firstly charged to 4.2V at a constant current of 0.1 C (160 mA), and secondly charged to a current less than 0.05 C (80 mA) at a constant voltage of 4.2V, the first charging capacity was obtained; and then each of the lithium-ion secondary batteries was discharged to 3.0V at a constant current of 0.5 C (800 mA), the first discharging capacity was obtained.

First coulombic efficiency of the lithium-ion secondary battery was evaluated by the ratio of the first discharging capacity and the first charging capacity, the first coulombic efficiency was calculated as follows:

First coulombic efficiency=(the first discharging capacity/the first charging capacity)×100%

(2) Test of the Cycle Performance

Respectively at 25° C. and 45° C., each of the lithium-ion secondary batteries was firstly charged to 4.2V at a constant current of 0.7 C (1120 mA), and secondly charged to a current less than 0.05 C (80 mA) at a constant voltage of 4.2V, and then each of the lithium-ion secondary batteries was discharged to 3.0V at a constant current of 0.5 C (800 mA). The discharging capacity at the present time was recorded as a first cycle discharging capacity. For the test, the lithium-ion secondary batteries were charged and discharged for 400 cycles according to the above manner, the $400^{th}$ cycle discharging capacity was recorded.

High temperature cycle performance of the lithium-ion secondary battery was evaluated by the capacity retention rate, the capacity retention rate was calculated as follows:

Capacity retention rate=(the $400^{th}$ cycle discharging capacity/the first cycle discharging capacity)×100%

(3) Test of the Low Temperature Discharging Performance

At 25° C., each of the lithium-ion secondary batteries was firstly charged to 4.2V at a constant current of 0.5 C (800 mA), and secondly charged to a current less than 0.05 C (80 mA) at a constant voltage of 4.2V, and then each of the lithium-ion secondary batteries was discharged to 3.0V at a constant current of 0.2 C (320 mA), the discharging capacity at 25° C. was obtained. At 25° C., each of the lithium-ion secondary batteries was then charged to 4.2V at a constant current of 0.5 C (800 mA), and then charged to a current less than 0.05 C (80 mA) at a constant voltage of 4.2V; and then at −20° C., each of the lithium-ion secondary batteries was placed for 2 h, then was discharged to 3.0V at a constant current of 0.2 C (320 mA), the discharging capacity at −20° C. was obtained.

Low temperature discharging performance of the lithium-ion secondary battery was evaluated by the low temperature capacity retention rate, the low temperature capacity retention rate was calculated as follows:

Capacity retention rate at −20° C.=(the discharging capacity at −20° C./the discharging capacity at 25° C.)×100%

Next analysis of test results of the lithium-ion secondary battery of the present disclosure were presented.

Table 1 illustrated related parameters and test results of examples 1-28 and comparative examples 1-9.

TABLE 1

Parameters and test results of examples 1-28 and comparative examples 1-9

| | additive | | | | first coulombic efficiency | cycle performance 25° C. | cycle performance 45° C. | low temperature −20° C. |
|---|---|---|---|---|---|---|---|---|
| | first additive type | first additive content | second additive type | second additive content | | | | |
| example 1 | VC | 0.20% | 4-methylene-1,3-dioxolan-2-one | 0.30% | 88.60% | 88% | 82% | 30% |
| example 2 | VC | 0.20% | 4-methylene-1,3-dioxolan-2-one | 0.50% | 89.20% | 90% | 85% | 35% |
| example 3 | VC | 0.20% | 4-methylene-1,3-dioxolan-2-one | 1.00% | 91.30% | 91% | 88% | 38% |
| example 4 | VC | 0.20% | 4-methylene-1,3-dioxolan-2-one | 3.00% | 90.80% | 90% | 89% | 32% |
| example 5 | VC | 0.20% | 4-methylene-1,3-dioxolan-2-one | 4.00% | 90.10% | 89% | 87% | 25% |
| example 6 | VC | 0.20% | 4,5-dimethylene-1,3-dioxolan-2-one | 0.50% | 88.60% | 88% | 82% | 30% |
| example 7 | VC | 0.30% | 4,5-dimethylene-1,3-dioxolan-2-one | 0.50% | 90.20% | 90% | 86% | 34% |
| example 8 | VC | 0.50% | 4,5-dimethylene-1,3-dioxolan-2-one | 0.50% | 91.50% | 91% | 88% | 33% |
| example 9 | VC | 1.00% | 4,5-dimethylene-1,3-dioxolan-2-one | 0.50% | 91.20% | 91% | 89% | 31% |
| example 10 | VC | 1.50% | 4,5-dimethylene-1,3-dioxolan-2-one | 0.50% | 90.80% | 91% | 89% | 28% |
| example 11 | VC | 2.00% | 4,5-dimethylene-1,3-dioxolan-2-one | 0.50% | 90.50% | 90% | 90% | 25% |
| example 12 | VEC | 0.20% | 4,5-dimethylene-1,3-dioxolan-2-one | 0.50% | 89.60% | 87% | 84% | 33% |
| example 13 | VEC | 0.30% | 4,5-dimethylene-1,3-dioxolan-2-one | 0.50% | 90.60% | 89% | 87% | 35% |
| example 14 | VEC | 0.50% | 4,5-dimethylene-1,3-dioxolan-2-one | 0.50% | 91.90% | 90% | 88% | 32% |
| example 15 | VEC | 1.00% | 4,5-dimethylene-1,3-dioxolan-2-one | 0.50% | 91.21% | 91% | 89% | 29% |
| example 16 | VEC | 1.50% | 4,5-dimethylene-1,3-dioxolan-2-one | 0.50% | 90.83% | 90% | 90% | 27% |
| example 17 | VEC | 2.00% | 4,5-dimethylene-1,3-dioxolan-2-one | 0.50% | 90.50% | 90% | 90% | 24% |
| example 18 | VC | 0.30% | 4-methylene-1,3-dioxolan-2-one 4,5-dimethylene-1,3-dioxolan-2-one | 0.50% 0.50% | 91.00% | 91% | 89% | 36% |
| example 19 | VC | 0.30% | 4-methylene-1,3-dioxolan-2-one 4,5-dimethylene-1,3-dioxolan-2-one | 1.50% 1.00% | 90.20% | 91% | 89% | 30% |
| example 20 | VC | 1.00% | 4-methylene-1,3-dioxolan-2-one 4,5-dimethylene-1,3-dioxolan-2-one | 2.00% 2.00% | 90.10% | 90% | 89% | 28% |
| example 21 | VC | 0.30% | 4,5-dimethylene-1,3-dioxolan-2-one | 1.00% | 91.50% | 91% | 89% | 37% |
| example 22 | VC | 1.50% | 4,5-diethylene-1,3-dioxolan-2-one | 1.00% | 91.20% | 90% | 88% | 34% |
| example 23 | VC | 0.30% | 4-(3-fluoropropylene)-1,3-dioxolan-2-one | 1.00% | 91.70% | 93% | 90% | 40% |
| example 24 | VC VEC | 0.50% 0.50% | 4,5-dimethylene-1,3-dioxolan-2-one | 0.50% | 91.30% | 91% | 89% | 31% |
| example 25 | VC | 0.30% | 4-fluoromethylene-1,3-dioxolan-2-one | 0.50% | 91.50% | 92% | 89% | 39% |
| example 26 | VC | 0.30% | 4,5-difluoromethylene-1,3-dioxolan-2-one | 0.50% | 91.40% | 92% | 90% | 40% |
| example 27 | VC | 1.00% | 4-fluoromethylene-1,3-dioxolan-2-one | 1.00% | 91.60% | 93% | 92% | 39% |
| example 28 | VC | 1.50% | 4-fluoromethylene-1,3-dioxolan-2-one | 3.00% | 91.30% | 92% | 91% | 35% |
| comparative example 1 | / | / | / | / | 50.20% | 42% | 26% | 12% |
| comparative example 2 | VC | 1.00% | / | / | 84.00% | 82% | 74% | 20% |
| comparative example 3 | / | / | 4-methylene-1,3-dioxolan-2-one | 2.00% | 81.00% | 82% | 70% | 21% |
| comparative example 4 | VC | 0.05% | 4-methylene-1,3-dioxolan-2-one | 0.05% | 70.80% | 50% | 34% | 18% |
| comparative example 5 | VEC | 3.00% | 4-methylene-1,3-dioxolan-2-one | 5.00% | 83.40% | 76% | 77% | 11% |
| comparative example 6 | VC | 0.05% | 4-methylene-1,3-dioxolan-2-one | 1.00% | 84.20% | 80% | 68% | 17% |
| comparative example 7 | VEC | 1.00% | 4-methylene-1,3-dioxolan-2-one | 5.00% | 85.70% | 78% | 74% | 15% |
| comparative example 8 | VC | 3.00% | 4-methylene-1,3-dioxolan-2-one | 1.50% | 85.20% | 75% | 76% | 12% |
| comparative example 9 | VC | 1.50% | 4-methylene-1,3-dioxolan-2-one | 0.05% | 86.00% | 78% | 78% | 19% |

(1) Analysis of Test Results of the First Coulombic Efficiency

As could be seen from the comparison among examples 1-28 and comparative example 1 (there was no additive, the first coulombic efficiency was 50.2%): the first coulombic efficiency of the lithium-ion secondary battery was effectively improved by adding a mixed additive of vinylene carbonate (VC) and/or vinyl ethylene carbonate (VEC) and 4-methylene-1,3-dioxolan-2-one and its derivatives and/or 4,5-dimethylene-1,3-dioxolan-2-one and its derivatives into the electrolyte of the lithium-ion secondary battery, this was because 4-methylene-1,3-dioxolan-2-one and its derivatives and/or 4,5-dimethylene-1,3-dioxolan-2-one and its derivatives had a higher reduction potential than vinylene carbonate (VC) and/or vinyl ethylene carbonate (VEC), the potential of the negative electrode plate was changed from high to low as formation charging, 4-methylene-1,3-dioxolan-2-one and its derivatives and/or 4,5-dimethylene-1,3-dioxolan-2-one and its derivatives preferentially formed a layer of SEI film with a lower impedance on the surface of the negative electrode plate, then vinylene carbonate (VC) and/or vinyl ethylene carbonate (VEC) formed another SEI film on the above SEI film, because that C=C connecting the methylene and the cyclopentyl of 4-methylene-1,3-dioxolan-2-one and its derivatives and/or 4,5-dimethylene-1,3-dioxolan-2-one and its derivatives and C=C of vinylene carbonate (VC) and/or vinyl ethylene carbonate (VEC) were polymerized, configurations of the two additives were tightly coupled to make the SEI film become a compact composite SEI film, and had a higher lithium ion conductivity, thereby improving the first coulombic efficiency of the lithium-ion secondary battery.

As could be seen from the comparison among comparative examples 1-9: there was no additive in comparative example 1, solvent would generate more by-reaction on the surface of the negative electrode plate, thereby resulting in the first coulombic efficiency of the lithium-ion secondary battery relatively lower, and was only 50.2%. Only vinylene carbonate (VC) or 4-methylene-1,3-dioxolan-2-one was used in comparative example 2 and comparative example 3 respectively, which could form a SEI film to prevent solvent from being reduced on the surface of the negative electrode plate, and could improve the first coulombic efficiency of the lithium-ion secondary battery. However, since the SEI film formed by only 4-methylene-1,3-dioxolan-2-one was not compact enough, the first coulombic efficiency of the lithium-ion secondary battery was still lower, and was only 81.0%; the lithium ion transfer performance of the SEI film formed by only vinylene carbonate (VC) was worse, the first coulombic efficiency of the lithium-ion secondary battery was also lower and was only 84.0%. In comparative examples 4-9, either the weight percentage of vinylene carbonate (VC) or vinyl ethylene carbonate (VEC) and/or 4-methylene-1,3-dioxolan-2-one was too low, the formed composite SEI film was not compact enough, the lithium ion transfer performance was worse, therefore the first coulombic efficiency of the lithium-ion secondary battery was lower (comparative example 4, comparative example 6, comparative example 9); or the weight percentage of vinylene carbonate (VC) or vinyl ethylene carbonate (VEC) and/or 4-methylene-1,3-dioxolan-2-one was too high, the impedance of the formed composite SEI film was increased, therefore the first coulombic efficiency of the lithium-ion secondary battery also was lower (comparative example 5, comparative example 7, comparative example 8).

As could be seen from the comparison among examples 1-5, when the weight percentage of vinylene carbonate (VC) was fixed to 0.2%, a compact composite SEI film could be formed by adding 0.3 wt %~4.0 wt % of 4-methylene-1,3-dioxolan-2-one. As the weight percentage of 4-methylene-1,3-dioxolan-2-one increased, the first coulombic efficiency of the lithium-ion secondary battery increased as well, but had a maximum (example 3), and as the weight percentage of 4-methylene-1,3-dioxolan-2-one continuously increased, the first coulombic efficiency of the lithium-ion secondary battery would decline by small amplitude (examples 3-5).

A similar tendency could also be seen from the comparison among examples 6-11, when the weight percentage of 4,5-dimethylene-1,3-dioxolan-2-one was fixed to 0.5%, a compact composite SEI film could be formed by adding 0.2 wt %~2.0 wt % vinylene carbonate (VC). And as the weight percentage of vinylene carbonate (VC) increased, the first coulombic efficiency of the lithium-ion secondary battery increased as well, but had a maximum (example 8), and as the weight percentage of vinylene carbonate (VC) continuously increased, the first coulombic efficiency of the lithium-ion secondary battery would decline by small amplitude (examples 8-11). Similarly, in examples 12-17, when the weight percentage of 4,5-dimethylene-1,3-dioxolan-2-one was fixed to 0.5%, the tendency by adding 0.2 wt %~2.0 wt % of vinyl ethylene carbonate (VEC) was similar to the tendency by adding 0.2 wt %~2.0 wt % of vinylene carbonate (VC).

As could be seen from the comparison among examples 18-24, a better compact composite SEI film was formed by adding 0.3 wt %~1.5 wt % of vinylene carbonate (VC) and/or vinyl ethylene carbonate (VEC), and 1.0 wt %~4.0 wt % of 4-methylene-1,3-dioxolan-2-one and its derivatives and/or 4,5-dimethylene-1,3-dioxolan-2-one and its derivatives, the first coulombic efficiency of the lithium-ion secondary battery was all more than 90%.

As could be seen from the comparison among examples 25-28, the first coulombic efficiency of the lithium-ion secondary battery was better than that in examples 1-24 and comparative examples 1-9 as a whole, this might be because that the F of the methylene of the second additive had a stronger electronegativity, therefore 4-methylene-1,3-dioxolan-2-one and its derivatives or 4,5-dimethylene-1,3-dioxolan-2-one and its derivatives had a higher reduction potential, and also because of the fluoric configuration, the composite SEI film might have better interface performance, thereby having better first coulombic efficiency.

(2) Analysis of Test Results of the Cycle Performance

As could be seen from the test results of the cycle performance of the lithium-ion secondary battery at 25° C. and 45° C., the tendency of the capacity retention rate of the lithium-ion secondary battery of examples 1-28 and comparative examples 1-9 at 25° C. was similar to the tendency at 45° C.

As could be seen from the comparison among examples 1-28 and comparative example 1 (there was no additive, the capacity retention rate at 25° C. was 42%, the capacity retention rate at 45° C. was 26%): the lithium-ion secondary battery had a higher capacity retention rate by adding a mixed additive of vinylene carbonate (VC) and/or vinyl ethylene carbonate (VEC) and 4-methylene-1,3-dioxolan-2-one and its derivatives and/or 4,5-dimethylene-1,3-dioxolan-2-one and its derivatives into the electrolyte of the lithium-ion secondary battery, this was because 4-methylene-1,3-dioxolan-2-one and its derivatives and/or 4,5-dimethylene-1,3-dioxolan-2-one and its derivatives had a higher reduction potential than vinylene carbonate (VC) and/or vinyl ethylene carbonate (VEC), the potential of the negative electrode plate was changed from high to low as formation charging, 4-methylene-1,3-dioxolan-2-one and its derivatives and/or 4,5-dimethylene-1,3-dioxolan-2-one and its derivatives preferentially formed a layer of SEI film with a lower impedance on the surface of the negative electrode plate, then vinylene carbonate (VC) and/or vinyl ethylene carbonate (VEC) formed another SEI film on the above SEI film, because that C=C connecting the methylene and the cyclopentyl of 4-methylene-1,3-dioxolan-2-one and its derivatives and/or 4,5-dimethylene-1,3-dioxolan-2-one and its derivatives and C=C of vinylene carbonate (VC) and/or vinyl ethylene carbonate (VEC) were polymerized, configurations of the two additives were tightly coupled to make the SEI film become a compact composite SEI film and prevent the by-reaction between the active material of the negative electrode plate and the electrolyte, thereby improving the cycle performance of the lithium-ion secondary battery.

As could be seen from the comparison among comparative examples 1-9: there was no additive in comparative example 1, solvent would generate more by-reaction on the surface of the negative electrode plate, the capacity retention rate of the lithium-ion secondary battery was lower, the capacity retention rate at 25° C. was only 42%, the capacity retention rate at 45° C. was only 26%. Only vinylene carbonate (VC) or 4-methylene-1,3-dioxolan-2-one was used in comparative example 2 and comparative example 3 respectively, a SEI film which was good for the cycle performance of the lithium-ion secondary battery could be formed. However, since the SEI film formed by only 4-methylene-1,3-dioxolan-2-one was not compact enough, the cycle performance of the lithium-ion secondary battery was still not good, especially the high temperature cycle performance was worse, the capacity retention rate at 25° C. was only 82%, the capacity retention rate at 45° C. was only 70%; the lithium ion transfer performance of the SEI film formed by only vinylene carbonate (VC) was worse, and the cycle performance of the lithium-ion secondary battery was also worse, the capacity retention rate at 25° C. was only 82%, the capacity retention rate at 45° C. was only 74%. In comparative examples 4-9, either the weight percentage of vinylene carbonate (VC) or vinyl ethylene carbonate (VEC) and/or 4-methylene-1,3-dioxolan-2-one was too low, the formed composite SEI film was not compact enough and could not prevent the by-reaction between the active material of the negative electrode plate and the electrolyte, therefore the capacity retention rate of the lithium-ion secondary battery was lower (comparative example 4, comparative example 6, comparative example 9); or the weight percentage of vinylene carbonate (VC) or vinyl ethylene carbonate (VEC) and/or 4-methylene-1,3-dioxolan-2-one was too high, the impedance of the formed composite SEI film was increased, and the stability of the formed composite SEI film was not well enough, therefore the capacity retention rate of the lithium-ion secondary battery also was lower (comparative example 5, comparative example 7, comparative example 8).

As could be seen from the comparison among examples 1-5, when the weight percentage of vinylene carbonate (VC) was fixed to 0.2%, a compact composite SEI film could be formed by adding 0.3 wt %~4.0 wt % of 4-methylene-1,3-dioxolan-2-one to prevent the by-reaction between the active material of the negative electrode plate and the electrolyte. And as the weight percentage of 4-methylene-1,3-dioxolan-2-one increased, the capacity retention rate of the lithium-ion secondary battery firstly increased, when the weight percentage increased to 3.0%, the capacity retention rate begun to decline by small amplitude (when the weight percentage increased to 4.0%, the capacity retention rate begun to decline by small amplitude at 45° C.).

A similar tendency could also be seen from the comparison among examples 6-11, when the weight percentage of 4,5-dimethylene-1,3-dioxolan-2-one was fixed to 0.5%, 0.2 wt %~2.0 wt % of vinylene carbonate (VC) was added, as the weight percentage of vinylene carbonate (VC) increased, the capacity retention rate of the lithium-ion secondary battery firstly increased, and when the weight percentage increased to 2.0%, the capacity retention rate begun to decline by small amplitude (no decline occurred at 45° C.). Similarly, in examples 12-17, when the weight percentage of 4,5-dimethylene-1,3-dioxolan-2-one was fixed to 0.5%, the tendency by adding 0.2 wt %~2.0 wt % of vinyl ethylene carbonate (VEC) was similar to the tendency by adding 0.2 wt %~2.0 wt % of vinylene carbonate (VC).

As could be seen from the comparison among examples 18-24, a compact composite SEI film was formed by adding 0.3 wt %~1.5 wt % of vinylene carbonate (VC) and/or vinyl ethylene carbonate (VEC) and 1.0 wt %~4.0 wt % of 4-methylene-1,3-dioxolan-2-one and its derivatives and/or 4,5-dimethylene-1,3-dioxolan-2-one and its derivatives to prevent the by-reaction between the active material of the negative electrode plate and the electrolyte, therefore the capacity retention rate of the lithium-ion secondary battery was all higher and not less than 90% (the capacity retention rate of the lithium-ion secondary battery was not less than 88% at 45° C.).

As could be seen from the comparison among examples 25-28, the capacity retention rate of the lithium-ion secondary battery was better than that in examples 1-24 and comparative examples 1-9 as a whole, this might be because F of the methylene of the second additive had a stronger electronegativity, therefore 4-methylene-1,3-dioxolan-2-one and its derivatives or 4,5-dimethylene-1,3-dioxolan-2-one and its derivatives had a higher reduction potential, and also because of the fluoric configuration, the configuration of the composite SEI film might be tighter, therefore the lithium-ion secondary battery had better capacity retention rate.

(3) Analysis of Test Results of the Low Temperature Discharging Performance

As could be seen from the comparison among examples 1-28 and comparative example 1 (there was no additive, the low temperature discharging capacity retention rate was 12%): the lithium-ion secondary battery had a higher low temperature discharging capacity retention rate by adding a mixed additive of vinylene carbonate (VC) and/or vinyl ethylene carbonate (VEC) and 4-methylene-1,3-dioxolan-2-one and its derivatives and/or 4,5-dimethylene-1,3-dioxolan-2-one and its derivatives into the electrolyte of the lithium-ion secondary battery, this was because 4-methylene-1,3-dioxolan-2-one and its derivatives and/or 4,5-dimethylene-1,3-dioxolan-2-one and its derivatives had a higher reduction potential than vinylene carbonate (VC) and/or vinyl ethylene carbonate (VEC), the potential of the negative electrode plate was changed from high to low as formation charging, 4-methylene-1,3-dioxolan-2-one and its derivatives and/or 4,5-dimethylene-1,3-dioxolan-2-one and its derivatives preferentially formed a layer of SEI film with a lower impedance on the surface of the negative electrode plate, then vinylene carbonate (VC) and/or vinyl ethylene carbonate (VEC) formed another SEI film on the above SEI film, because that C═C connecting the methylene and the cyclopentyl of 4-methylene-1,3-dioxolan-2-one and its derivatives and/or 4,5-dimethylene-1,3-dioxolan-2-one and its derivatives and C═C of vinylene carbonate (VC) and/or vinyl ethylene carbonate (VEC) were polymerized, configurations of the two additives were tightly coupled to make the SEI film become a compact composite SEI film and have a higher lithium ion conductivity, thereby improving the low temperature discharging capacity retention rate of the lithium-ion secondary battery.

As could be seen from the comparison among comparative examples 1-9: there was no additive in comparative example 1, the lithium ion conductivity was lower, therefore the low temperature discharging capacity retention rate of the lithium-ion secondary battery was lower and was only 12%. Only vinylene carbonate (VC) or 4-methylene-1,3-dioxolan-2-one was used in comparative example 2 and comparative example 3 respectively, a SEI film which was good for the low temperature cycle performance of the lithium-ion secondary battery could be formed, which prevented solvent from being further reduced on the surface of the negative electrode plate and prevented the reduzate from depositing on the surface of the negative electrode plate, and improved the low temperature discharging performance of the lithium-ion secondary battery. However, since the SEI film formed by only 4-methylene-1,3-dioxolan-2-one was not compact enough, solvent was further reduced on the surface of the negative electrode plate to form a deposition, therefore the low temperature discharging performance of the lithium-ion secondary battery was affected and was only 21%; the lithium ion transfer performance of the SEI film formed by only vinylene carbonate (VC) was worse, therefore the low temperature discharging performance of the lithium-ion secondary battery was also not good and was only 20%. In comparative examples 4-9, either the weight percentage of vinylene carbonate (VC) or vinyl ethylene carbonate (VEC) and/or 4-methylene-1,3-dioxolan-2-one was too low, the formed composite SEI film was not compact enough, the lithium ion transfer performance was worse, therefore the low temperature discharge capacity retention rate of the lithium-ion secondary battery was lower (comparative example 4, comparative example 6, comparative example 9); or the weight percentage of vinylene carbonate (VC) or vinyl ethylene carbonate (VEC) and/or 4-methylene-1,3-dioxolan-2-one was too high, the formed composite SEI film was too thick, thereby further reducing the low temperature discharging capacity retention rate of the lithium-ion secondary battery (comparative example 5, comparative example 7, comparative example 8).

As could be seen from the comparison among examples 1-5, when the weight percentage of vinylene carbonate (VC) was fixed to 0.2%, a compact composite SEI film which was good for lithium ion transfer could be formed by adding 0.3 wt %~4.0 wt % of 4-methylene-1,3-dioxolan-2-one. As the weight percentage of 4-methylene-1,3-dioxolan-2-one increased, the low temperature discharging capacity retention rate of the lithium-ion secondary battery firstly increased, when the weight percentage increased to 3.0%, the low temperature discharging capacity retention rate begun to decline, and when the weight percentage increased to 4.0%, the low temperature discharging capacity retention rate begun to decline by big amplitude, so when the weight percentage of 4-methylene-1,3-dioxolan-2-one was more than 3.0%, it was not good for the low temperature discharging capacity retention rate of the lithium-ion secondary battery.

A similar tendency could also be seen from the comparison among examples 6-11, when the weight percentage of 4,5-dimethylene-1,3-dioxolan-2-one was fixed to 0.5%, 0.2 wt %~2.0 wt % of vinylene carbonate (VC) was added. As the weight percentage of vinylene carbonate (VC) increased, the low temperature discharging capacity retention rate of the lithium-ion secondary battery firstly increased, when the weight percentage increased to 1.0%, the low temperature discharging capacity retention rate begun to decline, and when the weight percentage increased to 1.5%, the low temperature discharging capacity retention rate begun to decline by big amplitude, so when the weight percentage of the first additive vinylene carbonate (VC) was more than 1.5%, it was not good for the low temperature discharging capacity retention rate of the lithium-ion secondary battery. Similarly, in examples 12-17, when the weight percentage of 4,5-dimethylene-1,3-dioxolan-2-one was fixed to 0.5%, the tendency by adding 0.2 wt %~2.0 wt % of vinyl ethylene carbonate (VEC) was similar to the tendency by adding 0.2 wt %~2.0 wt % of vinylene carbonate (VC).

As could be seen from the comparison among examples 18-24, a better compact composite SEI film which was good for lithium ion transfer was formed by adding 0.3 wt %~1.5 wt % of vinylene carbonate (VC) and/or vinyl ethylene carbonate (VEC) and 1.0 wt %~4.0 wt % of 4-methylene-1,3-dioxolan-2-one and its derivatives and/or 4,5-dimethylene-1,3-dioxolan-2-one and its derivatives, the low temperature discharging capacity of the lithium-ion secondary battery was higher.

As could be seen from the comparison among examples 25-28, the low temperature discharging capacity of the lithium-ion secondary battery was better than that in examples 1-24 and comparative examples 1-9 as a whole, this might be because that F of the methylene of the second additive had a stronger electronegativity, 4-methylene-1,3-dioxolan-2-one and its derivatives or 4,5-dimethylene-1,3-dioxolan-2-one and its derivatives had a higher reduction potential, and also because of the fluoric configuration, the composite SEI film might have better interface performance, therefore the lithium-ion secondary battery had better low temperature discharging performance.

In conclusion: when the weight percentage of the first additive in the electrolyte of the lithium-ion secondary battery was too low (<0.2%) or too high (>2.0%) and when the weight percentage of the second additive in the electrolyte of the lithium-ion secondary battery was too low (<0.3%) or too high (>4.0%), the compact composite SEI film with good interface performance could not be formed, and the lithium-ion secondary battery with higher first coulombic efficiency, better cycle performance and better low temperature discharging performance could not be obtained. But when the electrolyte of the lithium-ion secondary battery consisted of 0.2 wt %~2.0 wt % of the first additive and 0.3 wt %~4.0 wt % of the second additive, preferably 0.3 wt %~1.5 wt % of the first additive and 0.5 wt %~3.0 wt % of the second additive, the first coulombic efficiency, the cycle performance and the low temperature discharging performance of the lithium-ion secondary battery were all good.

What is claimed is:

1. An electrolyte of a lithium-ion secondary battery, comprising:
    a lithium salt;
    a non-aqueous solvent; and
    an additive;
    the additive comprising a first additive and a second additive, the first additive comprising at least one of vinylene carbonate and vinyl ethylene carbonate, the second additive being 4-methylene-1,3-dioxolan-2-one and its derivatives with a structural formula 1 and/or 4,5-dimethylene-1,3-dioxolan-2-one and its derivatives with a structural formula 2;

structural formula 1

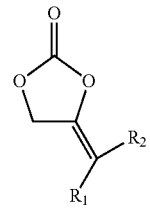

structural formula 2

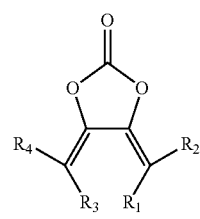

in the structural formula 1 and the structural formula 2, $R_1$, $R_2$, $R_3$ and $R_4$ each being hydrogen, halogen, C1~C3 alkyl or halogenated alkyl;

a weight percentage of the first additive in a total weight of the electrolyte of the lithium-ion secondary battery being 0.2%~2.0%, a weight percentage of the second additive in the total weight of the electrolyte of the lithium-ion secondary battery being 0.3%~4.0%;

wherein at least one of R1 and R2 is fluorine.

2. The electrolyte of the lithium-ion secondary battery according to claim 1, wherein the lithium salt comprises at least one of $LiN(C_xF_{2x+1}SO_2)(C_yF_{2y+1}SO_2)$ (where x, y is positive integer), $LiPF_6$, $LiBF_4$, $LiBOB$, $LiAsF_6$, $LiCF_3SO_3$ and $LiClO_4$.

3. The electrolyte of the lithium-ion secondary battery according to claim 1, wherein the non-aqueous solvent comprises a combination of a cyclic carbonate ester and a chain carbonate ester.

4. The electrolyte of the lithium-ion secondary battery according to claim 3, wherein
the cyclic carbonate ester comprises at least one of ethylene carbonate, propylene carbonate, γ-butyrolactone and 2,3-butylene carbonate;
the chain carbonate ester comprises at least one of dimethyl carbonate, diethyl carbonate, dipropyl carbonate, ethyl methyl carbonate, methyl propyl carbonate and ethyl propyl carbonate.

5. The electrolyte of the lithium-ion secondary battery according to claim 3, wherein
a weight percentage of the cyclic carbonate ester in the total weight of the electrolyte of the lithium-ion secondary battery is 10%~70%;
a weight percentage of the chain carbonate ester in the total weight of the electrolyte of the lithium-ion secondary battery is 15%~80%.

6. The electrolyte of the lithium-ion secondary battery according to claim 1, wherein the weight percentage of the first additive in the total weight of the electrolyte of the lithium-ion secondary battery is 0.3%~1.5%.

7. The electrolyte of the lithium-ion secondary battery according to claim 1, wherein the weight percentage of the second additive in the total weight of the electrolyte of the lithium-ion secondary battery is 0.5%~3.0%.

8. A lithium-ion secondary battery, comprising:
a positive electrode plate;
a negative electrode plate;
a separator interposed between the positive electrode plate and the negative electrode plate; and
an electrolyte, comprising:
a lithium salt;
a non-aqueous solvent; and
an additive;
the additive comprising a first additive and a second additive, the first additive comprising at least one of vinylene carbonate and vinyl ethylene carbonate, the second additive being 4-methylene-1,3-dioxolan-2-one and its derivatives with a structural formula 1 and/or 4,5-dimethylene-1,3-dioxolan-2-one and its derivatives with a structural formula 2;

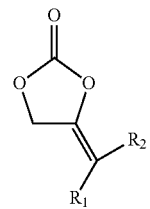

structural formula 1

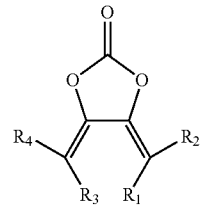

structural formula 2 in the structural formula 1 and the structural formula 2, $R_1$, $R_2$, $R_3$ and $R_4$ each being hydrogen, halogen, C1~C3 alkyl or halogenated alkyl;

a weight percentage of the first additive in a total weight of the electrolyte of the lithium-ion secondary battery being 0.2%~2.0%, a weight percentage of the second additive in the total weight of the electrolyte of the lithium-ion secondary battery being 0.3%~4.0%;

wherein at least one of R1 and R2 is fluorine.

9. The lithium-ion secondary battery according to claim 8, wherein the lithium salt comprises at least one of $LiN(C_xF_{2x+1}SO_2)(C_yF_{2y+1}SO_2)$ (where x, y is positive integer), $LiPF_6$, $LiBF_4$, $LiBOB$, $LiAsF_6$, $LiCF_3SO_3$ and $LiClO_4$.

10. The lithium-ion secondary battery according to claim 8, wherein the non-aqueous solvent comprises a combination of a cyclic carbonate ester and a chain carbonate ester.

11. The lithium-ion secondary battery according to claim 10, wherein
the cyclic carbonate ester comprises at least one of ethylene carbonate, propylene carbonate, γ-butyrolactone and 2,3-butylene carbonate;
the chain carbonate ester comprises at least one of dimethyl carbonate, diethyl carbonate, dipropyl carbonate, ethyl methyl carbonate, methyl propyl carbonate and ethyl propyl carbonate.

12. The lithium-ion secondary battery according to claim 10, wherein
a weight percentage of the cyclic carbonate ester in the total weight of the electrolyte of the lithium-ion secondary battery is 10%~70%;
a weight percentage of the chain carbonate ester in the total weight of the electrolyte of the lithium-ion secondary battery is 15%~80%.

13. The lithium-ion secondary battery according to claim 8, wherein the weight percentage of the first additive in the total weight of the electrolyte of the lithium-ion secondary battery is 0.3%~1.5%.

14. The lithium-ion secondary battery according to claim 8, wherein the weight percentage of the second additive in the total weight of the electrolyte of the lithium-ion secondary battery is 0.5%~3.0%.

* * * * *